(12) United States Patent
Fukushima et al.

(10) Patent No.: US 8,642,672 B2
(45) Date of Patent: Feb. 4, 2014

(54) COATING COMPOSITION

(75) Inventors: Motoo Fukushima, Annaka (JP); Yuji Yoshikawa, Annaka (JP); Kazuharu Sato, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/215,371

(22) Filed: Aug. 23, 2011

(65) Prior Publication Data

US 2012/0059080 A1 Mar. 8, 2012

(30) Foreign Application Priority Data

Sep. 8, 2010 (JP) ................................. 2010-200757

(51) Int. Cl.
*C08F 2/50* (2006.01)
*C08F 2/46* (2006.01)
*B29C 71/04* (2006.01)

(52) U.S. Cl.
USPC ........................ 522/64; 522/6; 522/1; 522/71

(58) Field of Classification Search
USPC ............................................ 522/64, 6, 1, 71
See application file for complete search history.

(56) References Cited

U.S. PATENT DOCUMENTS

| | | | | |
|---|---|---|---|---|
| 4,278,804 A | * | 7/1981 | Ashby et al. | 556/436 |
| 4,525,426 A | * | 6/1985 | Anthony | 428/447 |
| 4,590,287 A | * | 5/1986 | Riediker et al. | 556/53 |
| 4,624,916 A | * | 11/1986 | Shah et al. | 435/7.4 |
| 4,680,232 A | * | 7/1987 | Factor et al. | 428/412 |
| 4,820,788 A | * | 4/1989 | Zeigler | 528/33 |
| 5,756,793 A | * | 5/1998 | Valet et al. | 556/436 |
| 6,248,457 B1 | * | 6/2001 | Chen et al. | 428/690 |
| 6,620,509 B1 | | 9/2003 | Yamamoto et al. | |
| 7,862,886 B2 | * | 1/2011 | Fukushige et al. | 428/313.9 |
| 8,052,900 B2 | * | 11/2011 | Fukushima | 252/589 |
| 8,053,159 B2 | * | 11/2011 | Li et al. | 430/270.1 |
| 2003/0194571 A1 | * | 10/2003 | Takaguchi et al. | 428/447 |
| 2006/0257575 A1 | * | 11/2006 | Macor et al. | 427/372.2 |
| 2012/0058347 A1 | * | 3/2012 | Fukushima et al. | 428/412 |

FOREIGN PATENT DOCUMENTS

| | | | |
|---|---|---|---|
| EP | 143315 | * | 10/1984 |
| JP | 5-70397 | | 3/1993 |
| JP | 2001-139924 | | 5/2001 |
| JP | 2002-212491 | | 7/2002 |
| JP | 2003-138210 A | | 5/2003 |
| JP | 2006-188035 A | | 7/2006 |
| JP | 2010-84012 A | | 4/2010 |
| WO | WO 03/099550 A1 | | 12/2003 |
| WO | WO 2009/131038 A1 | | 10/2009 |

OTHER PUBLICATIONS

Extended European Search Report issued Nov. 25, 2011, in Patent Application No. 11179710.6.
Japanese Office Action issued Dec. 19, 2012 in patent Application No. 2010-200757.

* cited by examiner

*Primary Examiner* — Ling Choi
*Assistant Examiner* — Jessica E Whiteley
(74) *Attorney, Agent, or Firm* — Oblon, Spivak, McClelland, Maier & Neustadt, L.L.P.

(57) ABSTRACT

A coating composition is provided which contains (A) a co-hydrolytic condensate of a UV-absorbing alkoxysilane, a UV-curable alkoxysilane, and a tetraalkoxysilane, (B) a polyfunctional poly(meth)acrylate, and (C) a photobleachable photopolymerization initiator. Upon exposure to UV, the composition cures briefly at low temperature to form a cured film having durability, adhesion and transparency.

15 Claims, No Drawings

COATING COMPOSITION

CROSS-REFERENCE TO RELATED APPLICATION

This non-provisional application claims priority under 35 U.S.C. §119(a) on Patent Application No. 2010-200757 filed in Japan on Sep. 8, 2010, the entire contents of which are hereby incorporated by reference.

TECHNICAL FIELD

This invention relates to coating compositions comprising UV-curable resins.

BACKGROUND ART

In the prior art, articles of various materials including wood, plastics, glass, inorganic materials, metals, paper and the like are protected with coating compositions comprising UV-curable resins or thermosetting resins. In the case of articles intended for outdoor use, the cured films of coating compositions are exposed to sunlight, which causes the cured films to be gradually degraded so that their properties are exacerbated with the lapse of time. Even the coating compositions on those articles intended for indoor use cannot avoid the problem that the cured film is gradually degraded, because the articles are exposed to light from fluorescent lamps and the like. The cured films of coating compositions encounter the problem of photo-degradation that since sunlight and fluorescent lamp light contains ultraviolet (UV) radiation in a wavelength range of 200 to 400 nm which is detrimental to polymers or the like, the UV radiation causes functional groups in the polymer, residual polymerization catalyst and the like to be excited, whereby photo-degradation reaction takes place. For the purpose of preventing any decline of properties of a cured film by light in the detrimental spectrum, it is a common practice to add benzophenone or benzotriazole base UV absorbers to coating compositions. However, since these UV absorbers are low molecular weight compounds, they are less compatible with polymers. In addition, the absorbers will volatilize or be decomposed during preparation of coating composition, so that little absorber remains in the cured film resulting from coating and curing of the coating composition. Also, the absorber, even if retained in the cured film, will gradually bleed out of the film. For these reasons, the absorber is not fully effective for controlling any decline of properties of a cured film.

Then, JP-A 2001-139924 and JP-A 2002-212491 propose coating compositions comprising a UV-curable resin or thermosetting resin and a UV-absorbing polymer obtained from copolymerization of a UV-absorbing compound having a polymerizable unsaturated group incorporated therein with an addition polymerizable monomer such as a hydrophilic monomer, functional vinyl compound or functionality-free vinyl compound. These proposals intend to overcome the outstanding problem by converting the UV absorbing compound into a higher molecular weight one for thereby improving the compatibility thereof with the polymer component (i.e., UV-curable resin or thermosetting resin) in the coating composition.

The coating compositions of the above-cited patents have the advantage that the retention of the UV-absorbing compound in the cured film is improved due to improved compatibility between the UV-absorbing compound and the curable resin (i.e., thermosetting resin or UV-curable resin). Nevertheless, the inventors found that the adhesion between the cured film (which is cured by UV exposure) and a substrate (or member to be coated) is not sufficient, and some compositions are not fully transparent. Further, where coating compositions are used in electronic parts and building members, the cured films are required to have a high level of mar resistance and wear resistance as well as the hard coat function. If a UV-absorbing compound is added to such a coating composition, the UV-absorbing compound acts against the required properties. There is available no coating composition capable of forming a cured film having a good balance of durability, mar resistance, and wear resistance.

CITATION LIST

Patent Document 1: JP-A 2001-139924
Patent Document 2: JP-A 2002-212491

SUMMARY OF INVENTION

An object of the invention is to provide a coating composition comprising a UV-curable resin, for forming a cured film which is tenaciously adherent to a substrate and resistant to weathering.

The inventors have found that a coating composition is obtainable by combining (A) a co-hydrolytic condensate of a UV-absorbing alkoxysilane, specifically of formula (I) shown later, a UV-curable alkoxysilane, and a tetraalkoxysilane, (B) a polyfunctional poly(meth)acrylate, and (C) a photobleachable photopolymerization initiator and that upon exposure to UV, the composition is briefly cured at low temperature into a cured film which is fully durable, tenaciously adherent to a substrate, and transparent.

In one aspect, the invention provides a coating composition comprising (A) a co-hydrolytic condensate of a UV-absorbing alkoxysilane, a UV-curable alkoxysilane, and a tetraalkoxysilane, (B) a polyfunctional poly(meth)acrylate, and (C) a photobleachable photopolymerization initiator as essential components.

In a preferred embodiment, the coating composition is formulated in two parts, typically as a first composition comprising components (B) and (C) for forming a primer layer and a second composition comprising components (A) and (C) for forming a hard coat layer on the primer layer.

Preferably the UV-absorbing alkoxysilane in component (A) has the general formula (I).

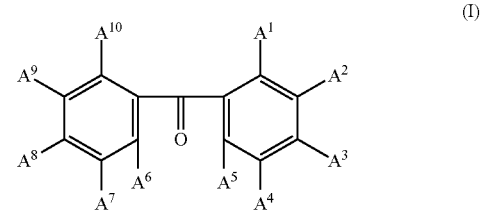

Herein $A^1$ to $A^{10}$ are each independently hydrogen, hydroxyl, $C_1$-$C_5$ alkyl, or a group having the following formula (i):

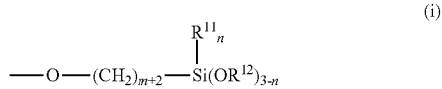

wherein $R^{11}$ and $R^{12}$ are each independently $C_1$-$C_5$ alkyl, m is an integer of 1 to 5, and n is an integer of 0 to 2, and formula (I) contains at least one hydroxyl group and at least one group of formula (i).

In a more preferred embodiment, the silanes from which the co-hydrolytic condensate (A) is formed include a UV-absorbing alkoxysilane having formula (I), a UV-curable alkoxysilane having the general formula (II), and a tetraalkoxysilane having the general formula (III):

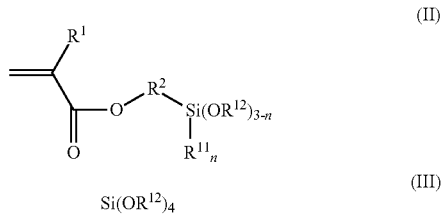

wherein $R^{11}$ and $R^{12}$ are each independently $C_1$-$C_5$ alkyl, n is an integer of 0 to 2, and $R^1$ is hydrogen or methyl, and $R^2$ is a divalent organic group of 1 to 6 carbon atoms.

The co-hydrolytic condensate (A) is typically obtained from co-hydrolytic condensation of alkoxysilanes having formulae (I) to (III) in the presence of an acidic catalyst.

The photobleachable photopolymerization initiator (C) is typically a metallocene, phosphine oxide or polysilane compound.

ADVANTAGEOUS EFFECTS OF INVENTION

The coating composition can be cured upon exposure to UV. A cured film can be briefly formed at low temperature which has the advantages of durability, tenacious adhesion to a substrate, and transparency.

DESCRIPTION OF EMBODIMENTS

The singular forms "a," "an" and "the" include plural referents unless the context clearly dictates otherwise. The notation (Cn-Cm) means a group containing from n to m carbon atoms per group. UV refers to the ultraviolet region of the electromagnetic spectrum. Mw refers to a weight average molecular weight as measured by gel permeation chromatography (GPC) versus polystyrene standards. The terminology "(meth)acrylate" refers collectively to acrylate and methacrylate.

The coating composition is a UV-curable resin composition comprising the following components (A) to (C) as essential components:
(A) a co-hydrolytic condensate of a UV-absorbing alkoxysilane, a UV-curable alkoxysilane, and a tetraalkoxysilane,
(B) a polyfunctional poly(meth)acrylate, and
(C) a photobleachable photopolymerization initiator.

The coating composition is often formulated in two parts, typically as a first composition comprising components (B) and (C) for forming a primer layer and a second composition comprising components (A) and (C) for forming a hard coat layer on the primer layer. The two parts are held in separate packages.
Component A Component (A) is a co-hydrolytic condensate of (a-1) a UV-absorbing alkoxysilane, (a-2) a UV-curable alkoxysilane, and (a-3) a tetraalkoxysilane. Since this component undergoes photopolymerization with the aid of (C) a photopolymerization initiator to form a cured film and possesses a UV absorbing ability, it is a main component for protecting a substrate, which is otherwise susceptible to UV degradation, from UV.

Component (A) is formed from silanes, specifically silanes (a-1), (a-2), and (a-3) mentioned just above. The silane (a-1) is preferably a UV-absorbing alkoxysilane having the general formula (I); the silane (a-2) is preferably a UV-curable alkoxysilane having the general formula (II); and the silane (a-3) is preferably a tetraalkoxysilane having the general formula (III), all shown below.

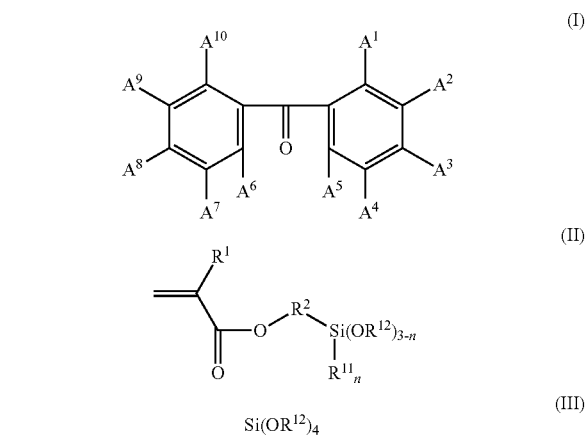

Herein $A^1$ to $A^{10}$ are each independently hydrogen, hydroxyl, $C_1$-$C_5$ alkyl, or a group having the following formula (i):

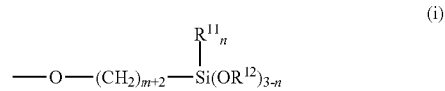

wherein $R^{11}$ and $R^{12}$ are each independently $C_1$-$C_5$ alkyl, m is an integer of 1 to 5, and n is an integer of 0 to 2, and formula (I) contains at least one, preferably one or two hydroxyl groups, and at least one, preferably 1 to 4 groups of formula (i). $R^1$ is hydrogen or methyl, and $R^2$ is a divalent organic group of 1 to 6 carbon atoms.

Examples of the $C_1$-$C_5$ alkyl represented by $A^1$ to $A^{10}$, $R^{11}$ and $R^{12}$ include methyl, ethyl, propyl, butyl, and pentyl. Preferably methyl is selected for $A^1$ to $A^{10}$, methyl is selected for $R^{11}$, and methyl and ethyl are selected for $R^{12}$. Examples of the divalent $C_1$-$C_6$ organic group represented by $R^2$ include alkylene groups such as methylene, ethylene, trimethylene and tetramethylene, and arylene groups such as phenylene, with trimethylene being preferred. The subscript m is an integer of 1 to 5, preferably 1 to 3, and n is an integer of 0 to 2, preferably 0 or 1.

As the UV-absorbing alkoxysilane (a-1), a silane having formula (I) is preferably used. This silane has a benzophenone structure in its molecule, which contributes to UV absorption. It also has an alkoxy group at the molecular end, which undergoes hydrolysis to form a reactive silanol, which in turn, undergoes condensation polymerization to attain a molecular weight buildup by itself or to bond with another ingredient.

Differently stated, the UV-absorbing silane is a benzophenone derivative having an alkoxysilyl group, which may be prepared as follows, for example. First, a polyhydroxybenzophenone (benzophenone having at least two hydroxyl groups) is reacted with an allyl halide and potassium carbonate in an organic solvent to form a polyhydroxy-polyallyloxybenzophenone. The benzophenone is then reacted with a hydroalkoxysilane in the presence of a platinum catalyst to form a polyhydroxy-poly(alkoxysilylalkoxy)benzophenone.

The benzophenone having at least two hydroxyl groups used as the starting reactant toward the UV-absorbing silane may be readily prepared as polyhydroxybenzophenone by reacting a phenol having at least two hydroxyl groups with an aromatic carboxylic acid. See JP-A H05-70397, for example. Examples of suitable polyhydroxybenzophenone include 4,4'-dihydroxybenzophenone, 2,4-dihydroxybenzophenone, 2,3,4-trihydroxybenzophenone, 2,4,4'-trihydroxybenzophenone, 2,2',4-trihydroxybenzophenone, 2,2',3,4-tetrahydroxybenzophenone, 2,3,4,4'-tetrahydroxybenzophenone, 2,2',4,4'-tetrahydroxybenzophenone, 2,2',3,4,4'-pentahydroxybenzophenone, 2,3-dihydroxy-4-methoxybenzophenone, 2,2'-dihydroxy-4-methoxybenzophenone, 2,4-dihydroxy-4'-methoxybenzophenone, 2,2'-dihydroxy-3,4-dimethoxybenzophenone, 2,3-dihydroxy-4,4'-dimethoxybenzophenone, 2,2'-dihydroxy-4,4'-dimethoxybenzophenone, 4-methoxy-2,2',4'-trihydroxybenzophenone, 4-methoxy-2',3',4'-trihydroxybenzophenone, 4-butoxy-2,2',4'-trihydroxybenzophenone, and 3,4-dimethoxy-2,2',4'-trihydroxybenzophenone.

The UV-absorbing silane having formula (I) used herein may be prepared by first reacting a polyhydroxybenzophenone with an allyl halide in an organic solvent to form an allyloxy-containing hydroxybenzophenone. The polyhydroxybenzophenone and the allyl halide are preferably combined in a molar ratio of 1:1 to 1:1.5. The organic solvent is not particularly limited insofar as the polyhydroxybenzophenone is dissolvable therein. The preferred organic solvents are ketones such as methyl ethyl ketone, methyl butyl ketone, methyl isopropyl ketone, and methyl isobutyl ketone. The solvent may be used in a sufficient amount to dissolve the polyhydroxybenzophenone, for example, in an amount which is 2 to 10 times the weight of polyhydroxybenzophenone. Typically the reaction may be conducted at a temperature of 40° C. to the boiling point of the organic solvent for about 1 to 24 hours.

The allyloxy-containing hydroxybenzophenone thus obtained is then reacted with a hydroalkoxysilane in the presence of a platinum catalyst, optionally in an inert solvent such as toluene or tetrahydrofuran or in a solventless system, to form a polyhydroxy-poly(alkoxysilyl-alkoxy)benzophenone. Suitable hydroalkoxysilanes used herein include hydrosilane compounds having one, two or three $C_1$-$C_5$ alkoxy groups such as methoxy, ethoxy, propoxy, butoxy and pentoxy. Preferred are trimethoxysilane and triethoxysilane. For reaction, the allyloxy-containing hydroxybenzophenone and the hydroalkoxysilane are preferably used in a molar ratio of 1:1 to 1:1.5, more preferably from 1:1 to 1:1.2. The platinum catalyst may be any of well-known platinum catalysts used in hydrosilylation reaction, for example, chloroplatinic acid and complexes thereof. The reaction may be carried out at room temperature to about 200° C., preferably 25° C. to about 100° C. When trimethoxysilane is used, the reaction may terminate within about 30 minutes to about 2 hours when the reaction temperature is room temperature to about 60° C.

The UV-absorbing alkoxysilane (a-1) may be used alone or in admixture of two or more.

The UV-curable alkoxysilane (a-2) may be an acrylic or methacrylic functional silane having the general formula (II). This silane forms a cured film through the mechanism that the acrylic or methacrylic group undergoes photopolymerization under the action of the photopolymerization initiator (C). It also has an alkoxy group at the molecular end, which undergoes hydrolysis to form a reactive silanol, which in turn, undergoes condensation polymerization to attain a molecular weight buildup by itself or to bond with another ingredient.

Examples of the (meth)acrylic functional silane include 3-acryloxypropyltrimethoxysilane, 3-methacryloxypropyltrimethoxysilane, 3-acryloxypropylmethyldimethoxysilane, 3-methacryloxypropylmethyldimethoxysilane, 3-acryloxypropyltriethoxysilane, and 3-methacryloxypropyltriethoxysilane. Inter alia, 3-acryloxypropyltrimethoxysilane and 3-methacryloxypropyltrimthoxysilane are preferred.

The UV-curable alkoxysilane (a-2) may be used alone or in admixture of two or more.

The tetraalkoxysilane (a-3) may be a silane having the general formula (III). The use of tetraalkoxysilane is effective for improving film hardness and adhesion. Examples of the tetraalkoxysilane include tetramethoxysilane, tetraethoxysilane, tetrapropoxysilane, and tetrabutoxysilane, with tetraethoxysilane being preferred.

The tetraalkoxysilane (a-3) may be used alone or in admixture of two or more.

The UV-absorbing alkoxysilane (a-1), UV-curable alkoxysilane (a-2) and tetraalkoxysilane (a-3) are preferably used in a proportion of 5 to 50% by weight of (a-1): 10 to 40% by weight of (a-2): 10 to 65% by weight of (a-3), provided that the total of (a-1), (a-2) and (a-3) is 100% by weight. Too high a proportion of UV-absorbing alkoxysilane (a-1) may fail to provide sufficient film hardness whereas too low a proportion thereof may lead to a film with poor weather resistance. Too high a proportion of UV-curable alkoxysilane (a-2) may lead to a film which is prone to crack whereas too low a proportion thereof may lead to under-cure. Too high a proportion of tetraalkoxysilane (a-3) may lead to a film which is prone to crack whereas too low a proportion thereof may lead to poor adhesion to the substrate.

Component (A) may be obtained by using the alkoxysilanes (a-1), (a-2) and (a-3) as starting reactants, and conducting co-hydrolysis and condensation in the presence of water or lower alcohol under acidic conditions using a catalytic amount of a hydrolytic catalyst.

The hydrolytic catalyst used herein may be selected from prior art well-known catalysts including acidic hydrogen halides, carboxylic acids, sulfonic acids, acidic or weakly acidic oxides and inorganic salts, and solid acids such as ion exchange resins. Suitable catalysts include organic acids such as acetic acid and maleic acid, and cation exchange resins having sulfonic acid groups or carboxylic acid groups on their surfaces. The hydrolytic catalyst is preferably used in an amount of 0.001 to 10 mol % based on the moles of hydrolyzable group. Hydrolysis is preferably carried out under weakly acidic conditions, typically at a pH value in the range of 2 to 7. If hydrolysis is carried out otherwise, the resulting silanol groups may remain unstable, allowing condensation reaction to further proceed to invite an extra molecular weight buildup.

To provide the topcoat film with a higher hardness, the hydrolysis must be followed by condensation. Condensation may be carried out subsequent to hydrolysis in a continuous manner, typically at room temperature or while heating at a temperature below 100° C. A temperature above 100° C. may cause gelation. Condensation may be promoted by distilling off the alcohol resulting from hydrolysis at or above 80° C. and atmospheric or subatmospheric pressure. Moreover, a condensation catalyst such as a basic compound, acidic compound or metal chelate (e.g., aluminum complex) may be added for the purpose of promoting condensation. Prior to or during the condensation step, an organic solvent may be added for the purpose of adjusting the progress of condensation or the concentration. Suitable organic solvents include alcohols such as methanol, ethanol, isopropanol, and isobutanol.

The co-hydrolytic condensate resulting from condensation should preferably have a weight average molecular weight (Mw) of 3,000 to 30,000, and more preferably 5,000 to 10,000, as measured by GPC versus polystyrene standards.

The co-hydrolytic condensate as component (A) may be used, for example, in the form of an isobutyl alcohol solution, which preferably has a nonvolatile (or solid) content of 10 to 50% by weight, more preferably 30 to 40% by weight as measured by heating at 150° C. for 30 minutes.

The co-hydrolytic condensate as component (A) may be used alone or in admixture of two or more.

Component B

Component (B) is a polyfunctional polyacrylate or polymethacrylate. It imparts adhesion to the composition upon UV curing. Preferred component (B) is a polyacrylate.

The polyfunctional poly(meth)acrylates include aliphatic polyisocyanates having at least two isocyanate groups in a molecule, polyols having at least two hydroxyl groups in a molecule, urethane poly(meth)acrylates obtained from reaction of hydroxyl-containing (meth)acrylates, and ester poly (meth)acrylates obtained from reaction of a polyhydric alcohol such as trimethylolpropane with a (meth)acrylic acid, which are all obtained from reactions by well-known techniques.

The urethane poly(meth)acrylates used herein are commercially available, for example, trifunctional aliphatic urethane acrylate under the trade name of Miramer PU340, deca (10)-functional aliphatic urethane acrylate under the trade name of Miramer MU9500, pentadeca(15)-functional aliphatic urethane acrylate under the trade name of Miramer SC2152, difunctional aromatic urethane acrylate under the trade name of Miramer MU3603, tetrafunctional aromatic urethane acrylate under the trade name of Miramer PU460, and hexafunctional aromatic urethane acrylate under the trade name of Miramer PU640, from Toyo Chemical Co., Ltd.

Examples of the ester poly(meth)acrylates used herein include trimethylolpropane tri(meth)acrylate, pentaerythritol tetra(meth)acrylate, tri(meth)acrylates of trimethylolpropane having 2 to 6 moles of ethylene oxide or propylene oxide added thereto, tetra(meth)acrylates of pentaerythritol having 2 to 6 moles of ethylene oxide or propylene oxide added thereto, ditrimethylolpropane tetra(meth)acrylate, dipentaerythritol hexaacrylate, and pentaerythritol tri(meth)acrylate. Inter alia, trimethylolpropane triacrylate and pentaerythritol triacrylate are preferred.

The polyfunctional poly(meth)acrylates may be used alone or in admixture of two or more. Preferably, an acrylate with a functionality of at least 3 is included, and more preferably in an amount of at least 30% by weight, specifically 30 to 100% by weight of component (B).

Component (B) is preferably used in an amount of 20 to 150 parts, more preferably 30 to 100 parts by weight per 100 parts by weight as solids of component (A). Less than 20 pbw of component (B) may lead to a less adherent coating whereas more than 150 pbw thereof may detract from the UV screen function.

The invention is characterized in that component (A), the co-hydrolytic condensate having an absorption wavelength of 200 to 380 nm is combined with (C) a photobleachable photopolymerization initiator having a specific absorption wavelength.

As used herein, the term "photobleachable" refers to photochemical nature which is one of environmental effects and rarely found with excited fluorescent molecules. This reaction occurs since a fluorescent substance in the excited state is chemically activated and unstable as compared with the ground state. As a result, the fluorescent molecules eventually take a low fluorescent structure. As used herein, the term refers to the phenomenon that a substance, which absorbs light in a certain UV region, generates a radical, and functions as a polymerization initiator, ceases to absorb light in that UV region when the conjugated bond in its molecule after radical generation is severed. As a result, the light in that UV region can be transmitted to the interior, and accordingly cure can smoothly proceed even in a thick film.

The photobleachable photopolymerization initiator (C) typically has an absorption wavelength in the range of 350 to 450 nm. Then cure can be readily effected with UV of 350 to 450 nm. Since the cured portion permits UV of 350 to 450 nm to be transmitted, a thick film is improved in depth cure. Eventually a cured film having improved weather resistance can be formed.

Known photobleachable photopolymerization initiators include phosphine oxide, polysilane, and metallocene photopolymerization initiators.

Suitable photobleachable photopolymerization initiators include monoacylphosphine oxide photopolymerization initiators such as benzoyl-diphenylphosphine oxide, 2,4,6-trimethylbenzoyl-diphenylphosphine oxide, 2,3,5,6-tetramethyl-benzoyl-diphenylphosphine oxide, and 3,4-dimethylbenzoyl-diphenylphosphine oxide; bisacylphosphine oxide photopolymerization initiators such as bis(2,4,6-trimethylbenzoyl)phenylphosphine oxide, bis(2,6-dimethoxybenzoyl)-2,4,4-trimethylpentylphosphine oxide, and bis(2,6-dimethylbenzoyl)ethylphosphine oxide; metallocene (titanocene)photopolymerization initiators such as bis(η5-2,4-cyclopentadien-1-yl)-bis(2,6-difluoro-3-(1H-pyrrol-1-yl)phenyl)titanium; and polysilane photopolymerization initiators such as phenylmethylpolysilane, diphenylpolysilane, and phenylpolysilane. These photopolymerization initiators are commercially available under the trade name, for example, of Irgacure 819 and Irgacure 784 from BASF.

The photopolymerization initiator is preferably used in an amount of 0.1 to 20% by weight, more preferably 1 to 15% by weight based on the solids in the composition (total weight of solids of components (A) to (C)). If the content of the initiator is less than 0.1 wt %, a coating may be under-cured upon UV exposure. If the content of the initiator exceeds 20 wt %, it may inhibit transmission of UV to the film interior and so, in the case of a thick film, film properties including hardness and adhesion may become poor.

In the preferred embodiment wherein component (C) is used along with component (B) as a first composition and component (C) is used along with component (A) as a second composition, the amount of component (C) blended in the first composition is preferably 0.01 to 30% by weight, and the amount of component (C) blended in the second composition is preferably 0.01 to 30% by weight. In this case, the total amount of component (C) blended in the first and second compositions should preferably be 0.1 to 20% by weight.

The coating composition may further comprise (D) an organic solvent, typically an alcohol as a diluent, and specifically an organic solvent containing an alcohol. Component (D) may be an alcohol alone or a mixture of an alcohol and another organic solvent. Both the alcohol and the other solvent may be of more than one type. When a mixture of an alcohol and another organic solvent is used, the content of the organic solvent may be 0 to 30% by weight of the mixture.

Examples of the alcohol as component (D) include methanol, ethanol, isopropyl alcohol, butanol, isobutyl alcohol, ethylene glycol, diethylene glycol, triethylene glycol, ethylene glycol monomethyl ether, diethylene glycol monomethyl ether, triethylene glycol monomethyl ether, propylene glycol monomethyl ether (PGM), and polyethylene glycol monomethyl ether (PGMD). Examples of the other organic solvent include ketones (of 2 to 20 carbon atoms, for example) such as acetone, methyl ethyl ketone and methyl isobutyl ketone; aromatic hydrocarbons (of 6 to 20 carbon atoms, for example) such as toluene and xylene; aliphatic hydrocarbons (of 5 to 30 carbon atoms, for example) such as hexane, octane, and heptane; chlorinated organic solvents (of 1 to 20 carbon atoms, for example) such as chloroform, methylene chloride, trichloroethylene, and carbon tetrachloride; and esters (of 1 to 20 carbon atoms, for example) such as ethyl acetate, butyl acetate, and isobutyl acetate.

In the composition, the amount of component (D) if used is preferably 10 to 5,500 parts, more preferably 10 to 1,000 parts by weight per 100 parts by weight of the essential components (i.e., total of components (A) to (C)). If the amount of component (D) is too much, the composition may have too low a viscosity to be coated to a sufficient film thickness.

In the preferred embodiment wherein the composition is formulated as first and second compositions, component (D) may be used in both of the first and second compositions. In the first composition, the amount of component (D) blended is preferably 0 to 100 parts by weight per 100 parts by weight of components (B) and (C) combined. In the second composition, the amount of component (D) blended is preferably 10 to 5,500 parts by weight per 100 parts by weight of components (A) and (C) combined.

If desired, the coating composition may further comprise an aluminum complex such as aluminum acetylacetonate as an optional component. It is a component optionally used in hydrolysis of component (A). The amount of the aluminum complex blended is preferably 0.01 to 20 parts, more preferably 0.1 to 5 parts by weight per 100 parts by weight of component (A).

As long as the objects of the invention are not impaired, the coating composition may further comprise surfactants serving as a defoamer, anti-settling agent, dispersant, antistatic agent or anti-fogging agent, colorants such as pigments and dyes, and fillers such as aluminum paste, talc, glass frit and powdered metals. In the preferred embodiment wherein the composition is formulated as first and second compositions, such additives are preferably added to the second composition.

The coating composition may be prepared by any desired methods, for example, by mixing components (A) to (C) and optionally component (D) and other additives. Once the components are combined together, they are preferably compounded by stirring at 25 to 90° C. for 0.1 to 10 hours. The resulting composition looks uniform in appearance due to compatibility among the components, and can form a uniform coating with aesthetic appearance onto various substrates.

The coating composition may be coated and cured onto various substrates to form a cured film thereon. In order that the coating composition be coated to a substrate surface and cured into a cured film having improved adhesion to the substrate, preferably a layer of a composition comprising the polyfunctional poly(meth)acrylate (B) is previously formed on the substrate as a primer layer. In a potential situation wherein the adhesion between the substrate and the cured film of the coating composition is low, the previous coverage of the substrate surface with the primer layer of a composition comprising the adhesion-contributing polyfunctional poly(meth)acrylate (B) can significantly improve the adhesion between the substrate and the cured film. Specifically, in the preferred procedure, a primer layer of a composition comprising components (B) and (C), preferably free of component (A) is coated on a substrate surface, a hard coat layer of a composition comprising components (A) and (C), preferably free of component (B) is coated on the primer layer, and these coated layers are cured by UV exposure for thereby forming a cured resin film of two layers.

Using such a coating procedure, a cured film having improved properties including UV screen, hardness, mar resistance, transparency, substrate adhesion, smoothness, and uniformity can be formed from the coating composition.

The material of the substrate which can be coated with the composition may be selected from plastics, ceramics, glass, metals, and the like. Inter alia, plastic substrates of polyacrylate, polycarbonate, polystyrene, and vinyl chloride resins, for example, are preferred, with polyacrylate resins being most preferred. The shape of the substrate is not particularly limited, and includes plate, film, sheet, bottle, and solid shapes. Substrates of plate or film shape are preferred. The thickness of the substrate is not particularly limited. If the substrate is of film or sheet shape, its thickness is generally in a range of 5 to 500 preferably 5 to 100 µm. If the substrate is a thick plate, its thickness is preferably in a range of 0.005 to 0.1 meter.

The technique of coating the composition is not particularly limited. By any well-known coating techniques such as flow coating, spin coating, spray coating, curtain coating, gravure coating, Mayer bar coating, and dip coating, the composition can be coated as a thin film layer on a surface of any substrates. Prior to coating, the substrate surface may be subjected to pretreatment, for example, primer treatment using a silane coupling agent or a hydrolyzate thereof, surface activation treatment such as corona treatment, or anchor treatment using acrylic resins or urethane resins.

The coating weight of the coating composition is not particularly limited. Where mar resistance is required, the coating weight of the coating composition is preferably such that the cured layer may have a thickness of 0.5 to 25 µm, more preferably 1 to 20 µm. In the embodiment wherein a resin coating of two layers, primer and hard coat layers is formed, it is preferred that the primer layer have a thickness of 0.1 to 20 µm, more preferably 0.5 to 10 µm after curing, the hard coat layer have a thickness of 0.5 to 30 µm, more preferably 1 to 15 µm after curing, and the resin coating of two or more layers have a total thickness of 0.6 to 35 µm, more preferably 1 to 25 µm after curing.

After the coating step, the (thin) coating is dried and then cured with UV. While the coating composition dries at room temperature, heat may be applied if rapid drying is desired. In the latter case, the coating is preferably dried by heating at 40 to 150° C., more preferably 80 to 105° C. for 1 to 180 minutes, more preferably 1 to 60 minutes. After the coating composition is coated onto a substrate and dried, it is exposed to UV. UV exposure is in a dose of at least 10 mJ/cm$^2$, preferably 100 to 3,000 mJ/cm$^2$. It is also possible to combine heat curing and UV curing. In this case, the cured thin film can be formed within a very short time. The heat curing procedure involves solvent removal and subsequent UV exposure, for example, the steps of heating at 80° C. for 5 minutes to remove the solvent and then exposing to UV in a dose of 600 mJ/cm$^2$.

Through the coating and curing procedure described above, the inventive composition forms a weather resistant cured film having improved properties including UV screen (specifically UV absorption in the UV-A region of wavelength 380 nm or shorter), hardness, mar resistance, transparency, substrate adhesion, smoothness, and uniformity. Therefore, the composition is advantageously used as a surface coating agent for those substrates which are intended for outdoor use in an environment subject to long-term sunlight exposure and required to have aesthetic appearance and strength, for example, building windowpane replacement plastic members. In particular, the composition is advantageously used as a surface coating agent for building exterior members of polyacrylate resin.

As mentioned above, the inventive composition is useful as a coating agent or film former on various substrates. The cured film obtained by curing the composition is suited for surface protection and weather resistance improvement of resin articles which are susceptible to photo-degradation by UV of wavelength 380 nm or shorter. The cured film is very useful as a surface coating agent for building exterior members which are intended for outdoor use in an environment subject to long-term sunlight exposure.

Since the inventive composition cures into a weather resistant film having a UV absorbing effect, the composition may be coated onto a flexible substrate having a low hardness such as natural rubber or synthetic rubber, to form a cured film on the flexible substrate. The flexible substrate may have any shape such as sheet, film, roll, tube or the like, and even be a molded article of any profile. Substrates of filled materials may also be used. When the composition is coated onto a substrate of belt or roll form or a keypad-form substrate, the coating can impart weather resistance, UV absorption effect, mar resistance and wear resistance to the substrate surface without detracting from conformity to the substrate and durability. The flexible substrates having such a cured film find use as keypads in mobile phones, remote controllers and the like, and components in copiers, printers and other business machines, for example, charging rolls, transfer rolls, transfer belts, intermediate transfer belts, development rolls, fixing rolls, and cleaning blades.

EXAMPLE

Synthesis Example, Preparation Examples, Examples and Comparative Examples are given below for further illustrating the invention although the invention is not limited thereto.

Synthesis Example 1

Synthesis of UV-absorbing silane (KBM-UV03)

A reactant, 4-allyloxy-2-hydroxybenzophenone was purchased from Aldrich Co. In 70 ml of toluene was dissolved 25.4 g (0.1 mol) of 4-allyloxy-2-hydroxybenzophenone. Two droplets of platinum catalyst PL50-T (Shin-Etsu Chemical Co., Ltd.) was added to the solution. The temperature was raised to 65° C., whereupon 29.3 g (0.24 mol) of trimethoxysilane was added to the solution.

The reaction mixture was kept at a temperature of about 65° C. to 85° C. for about 1 to 2 hours. The reaction mixture was cooled, whereupon 5 g of Wakogel C-100 was added thereto for adsorbing the platinum catalyst. This was followed by filtration and vacuum stripping of the solvent, yielding 34.8 g (0.092 mol) of a red oily matter. A NMR spectrum of the main ingredient corresponded to the structure of 2-hydroxy-4-trimethoxysilylpropoxybenzophenone. Yield 92%. This silane is designated KBM-UV03.

Preparation Example 1

To a mixture of 75 g of 3-acryloxypropyltrimethoxy-silane (KBM-5103, Shin-Etsu Chemical Co., Ltd.), 25 g of KBM-UV3 in Synthesis Example 1, 125 g of tetraethoxysilane (KBE-04, Shin-Etsu Chemical Co., Ltd.), and 50 g of isobutyl alcohol, 65 g of 0.25N acetic acid aqueous solution was added dropwise at 5 to 10° C. over 2 hours. The reaction mixture was ripened at room temperature for 3 hours. Then 0.75 g of NACEM Alumi (aluminum acetylacetonate $Al(C_5H_7O_2)_3$, Nihon Kagaku Sangyo Co., Ltd.) was added to the reaction mixture, which was mixed and filtrated, obtaining Solution 1: 5103-UVA (A).

Comparative Preparation Example 1

To a mixture of 75 g of 3-acryloxypropyltrimethoxysilane (KBM-5103, Shin-Etsu Chemical Co., Ltd.), 25 g of 2-acryloxypropylmethyldimethoxysilane (KBM-5102, Shin-Etsu Chemical Co., Ltd.), 125 g of tetraethoxysilane (KBE-04, Shin-Etsu Chemical Co., Ltd.), and 50 g of isobutyl alcohol, 65 g of 0.25N acetic acid aqueous solution was added dropwise at 5 to 10° C. over 2 hours. The reaction mixture was ripened at room temperature for 3 hours. Then 0.75 g of NACEM Alumi (aluminum acetylacetonate $Al(C_5H_7O_2)_3$, Nihon Kagaku Sangyo Co., Ltd.) was added to the reaction mixture, which was mixed and filtrated, obtaining Comparative Solution 1: 5103 (A).

Preparation Example 2

To 50 g of Miramer MU9500 (deca(10)-functional aliphatic urethane acrylate, Toyo Chemical Co., Ltd.) as a urethane acrylate resin was added 50 g of propylene glycol monomethyl ether (PGM). The contents were mixed and filtrated, obtaining PGM-9500 (B).

Preparation Example 3

To 45 g of Miramer PU640 (hexa(6)-functional aliphatic urethane acrylate, Toyo Chemical Co., Ltd.) as a urethane acrylate resin was added 55 g of propylene glycol monomethyl ether (PGM). The contents were mixed and filtrated, obtaining PGM-640 (B).

Preparation Example 4

To 50 g of Miramer PU340 (tri(3)-functional aliphatic urethane acrylate, Toyo Chemical Co., Ltd.) as a urethane acrylate resin was added 50 g of propylene glycol monomethyl ether (PGM). The contents were mixed and filtrated, obtaining PGM-340 (B).

The solutions thus prepared were evaluated for physical properties by the following methods, with the results summarized in Table 1.
(1) Evaluation Method of Coating Solution
(1.1) Appearance
A clear glass bottle was filled with a sample (25 g) of the composition solution for visual observation.
(1.2) Viscosity
The sample was loaded into a Cannon-Fenske viscometer, which was placed in a thermostatic water bath at 25° C. The time required for the sample to flow was measured, from which a kinematic viscosity was computed using the viscometer's constant.

(1.3) Refractive Index

The refractive index was measured by a refractometer RX7000α (Atago Co., Ltd) in a thermostatic environment at 25° C.

(1.4) Nonvolatile Content

A sample was weighed, placed in an aluminum dish, heated in an oven at 150° C. for 30 minutes, and weighed again. A nonvolatile content was computed from the measurements.

(1.5) UV Absorption

A quartz glass cell (thickness 10 mm) was filled with the composition solution. Using a spectrophotometer U-3310 (Hitachi High-Tech Fielding Corporation), the UV-visible transmission spectrum was measured in a wavelength range of 200 to 500 nm. The UV absorption was evaluated in terms of a transmittance at 375 nm.

(1.6) Mw

A predetermined amount of the sample was diluted with DMF to a concentration of 0.5 wt % before Mw was measured by a liquid chromatograph HLC-8220GPC (Tosoh Corporation) calibrated with polystyrene standards.

(1.7) pH

The pH was measured by a pH meter (pH/ION Meter F-24, Horiba, Ltd.).

(1.8) Water Content

A water content in a sample was measured by Aquacounter AQV-2100 (Hiranuma Sangyo Co., Ltd.) according to the Karl Fischer method.

UV curing agents used in Examples and Comparative Examples are identified below. Irgacure 819 (bis(2,4,6-trimethylbenzoyl)phenylphosphine oxide, BASF) was used as the photobleachable UV curing agent. For comparison sake, Darocure 1173 (2-hydroxy-2-methyl-1-phenylpropan-1-one, Merck & Co., Inc.) and Irgacure 369 (2-benzyl-2-dimethylamino-1-(4-morpholinophenyl)butanone, BASF) were used as the non-photobleachable UV curing agent.

Example 1

Coating composition A was prepared by mixing 100 g of Solution 1 with 3 g of Irgacure 819. Coating composition B was prepared by mixing 100 g of PGM-9500 (B) with 3 g of Irgacure 819.

A test piece was prepared by applying the coating composition on a polyacrylic plate (Mitsubishi Rayon Co., Ltd.). First, coating composition B was flow coated on the polyacrylic plate and then coating composition A was flow coated thereon such that each cured layer might have a thickness of 10 μm. The coating of two layers was air dried at room temperature for 10 minutes and heated at 80° C. for 2 minutes. The coating was passed under a high-pressure mercury lamp (UV irradiation unit, Eye Graphics Co., Ltd.) having an exposure dose of 600 mJ/cm$^2$ (irradiation energy at 365 nm as measured by a UV meter UVPF-36) whereby the coating was cured.

The coating was evaluated by the following methods. The formulation and results are shown in Table 2.

TABLE 1

| | Components, g | Preparation Example 1 (A) 5103-UVA | Comparative Preparation Example 1 (A) 5103 | Preparation Example 2 (B) PGM-9500 | Preparation Example 3 (B) PGM-640 | Preparation Example 4 (B) PGM-340 |
|---|---|---|---|---|---|---|
| (A) | KBM-5103 | 75 | 75 | — | — | — |
| | KBM-5102 | 0 | 25 | — | — | — |
| | KBM-UV03 | 25 | 0 | — | — | — |
| | KBE-04 | 125 | 125 | — | — | — |
| | IBA | 50 | 50 | — | — | — |
| | 0.25N AcOH in water | 65 | 65 | — | — | — |
| | Al(C$_5$H$_7$O$_2$)$_3$ | 0.75 | 0.75 | — | — | — |
| (B) | Miramer MU9500 | — | — | 50 | 0 | 0 |
| | Miramer PU640 | — | — | 0 | 45 | 0 |
| | Miramer PU340 | — | — | 0 | 0 | 50 |
| | PGM | — | — | 50 | 55 | 50 |

| Physical properties | Conditions or Unit | | | | | |
|---|---|---|---|---|---|---|
| Appearance | | Clear solution | Clear solution | Clear solution | Clear solution | Clear solution |
| Viscosity | mm$^2$/s | 7.19 | 6.01 | 17.7 | 13 | 49 |
| Refractive index | 25° C. | 1.4017 | 1.393 | 1.4419 | 1.4433 | 1.4438 |
| Nonvolatile content | 150° C./0.5 h | 35.03% | 35.01% | 50% | 44% | 49% |
| UV absorption | Transmittance at 375 nm | 3% | 100% | 100% | 100% | 100% |
| Mw | 0.5 wt % in DMF | 6,700 | 3,500 | 3,200 | 1,700 | 2,400 |
| pH | 25° C. | 2.32 | 2.34 | — | — | — |
| Water content | % | 9.49 | 8.49 | ≤0.1 | ≤0.1 | ≤0.1 |

Comparative Examples 1 to 3

For comparison, the same procedure as in Example 1 was repeated except for the following change. In Comparative Example 1, Darocure 1173 was used instead of Irgacure 819. In Comparative Example 2, Irgacure 369 was used instead of Irgacure 819. In Comparative Example 3, Comparative Solution: 5103 (A) was used instead of Solution: 5103-UVA (A). The coatings were evaluated by the following methods. The formulation and results are shown in Table 2.

Examples 2 and 3

The same procedure as in Example 1 was repeated except that PGM-640 (B) was used in Example 2 instead of PGM-9500 (B) in Example 1; and PGM-340 (B) was used in Example 3 instead of PGM-9500 (B) in Example 1. The coatings were evaluated by the following methods. The formulation and results are shown in Table 2.

Evaluation Method of Coating

The coatings in Examples and Comparative Examples were measured for physical properties and evaluated according to the following methods.

[Coating Formation]

A test piece was prepared by applying the composition as two coating compositions on a resin film. First, coating composition B was flow coated on the resin film and then coating composition A was flow coated thereon. The coating of two layers was air dried for 10 minutes and heated at 80° C. for 2 minutes. The coating was passed under a high-pressure mercury lamp (UV irradiation unit, Eye Graphics Co., Ltd.) having an exposure dose of 600 mJ/cm$^2$ (irradiation energy at 365 nm as measured by a UV meter UVPF-36) whereby the coating was cured.

(1) Physical Properties of Coating (1.1) Appearance of Coating

The test piece after coating, air drying and heating at 80° C. for 2 minutes was visually observed.

(1.2) Appearance and Cure State of UV-Cured Coating

The coating on the test piece cured by UV exposure of 600 mJ/cm$^2$ was visually observed. The cured state was evaluated by touching the surface with a finger.

(1.3) UV Absorption

A UV-visible transmission spectrum of a coated test piece cured by UV exposure of 600 mJ/cm$^2$ was measured in a wavelength range of 200 to 500 nm by spectrophotometer U-3310 (Hitachi High-Tech Fielding Corporation). A transmittance of UV at 375 nm was selected. The result is reported as UV "non-absorbing" when the transmittance is more than or equal to 80%, UV "absorbing" when the transmittance is less than or equal to 20%, and "moderate" UV absorbing when the transmittance is from more than 20% to less than 80%.

(1.4) Pencil Hardness

The coating was measured for pencil hardness according to JIS K-5400, specifically by placing a test piece horizontally and pressing pencils with different degrees of hardness against the coating at an angle of 45±1° under a load of 1,000±10 g.

(1.5) Initial Adhesion

Adhesion was analyzed according to JIS K-5400, specifically by scribing the test piece with a razor along 6 longitudinal and 6 transverse lines at a spacing of 2 mm to define 25 square sections, tightly attaching a commercial cellophane adhesive tape strip thereto, rapidly pulling back the adhesive tape at an angle of 90°, and counting the number (X) of coating sections kept unpeeled. The result is expressed as X/25.

(1.6) Adhesion after Boiling

The test piece was immersed in boiling water for 2 hours, after which its appearance was visually observed and the adhesion test was carried out as described above.

(2) Evaluation of Cured Coating (2.1) Processability (UV Curability)

The test piece in the form of a resin film having a coating cured by UV exposure of 600 mJ/cm$^2$ was rated for appearance according to the following criterion by visual observation and finger touch.

○: good
Δ: slightly tacky on coating surface
x: tacky on entire coating surface (2.2) Optical Properties A test piece was prepared by applying the composition on a quartz glass (thickness of 1 mm). First, coating composition B was flow coated on the glass and then coating composition A was flow coated thereon. The coating of two layers was air dried for 10 minutes and heated at 80° C. for 2 minutes. The coating was passed under a high-pressure mercury lamp (UV irradiation unit, Eye Graphics Co., Ltd.) having an exposure dose of 600 mJ/cm$^2$ (irradiation energy at 365 nm as measured by a UV meter UVPF-36) whereby the coating was cured. The UV-visible transmission spectrum of the test piece was measured in a wavelength range of 200 to 500 nm by spectrophotometer U-3310 (Hitachi High-Tech Fielding Corporation). Transparency and UV screen were evaluated in terms of transmittance at 450 nm and 350 nm, respectively.

Transparency
Rating Transmittance at 450 nm
○: at least 80%
Δ: more than 20% to less than 80%
x: up to 20%

UV Screen
Rating Transmittance at 350 nm
○: up to 20%
Δ: more than 20% to less than 80%
x: at least 80%

(2.3) Mar Resistance

The test piece in the form of coated resin film was examined for mar resistance by rubbing the coating 10 times with a steel wool pad #0000 under a load of about 500 g. The marred surface was rated according to the following criterion by visual observation.

○: substantially no flaws
Δ: some flaws
Δ: many flaws (2.4) Initial Adhesion

The test piece was tested for initial adhesion according to JIS K-5400, and rated as follows in terms of the number (X) of coating sections kept unpeeled after the test.

○: X=25 to 21
Δ: X=20 to 6
x: X=5 to 0

(2.5) Durability

The test piece was immersed in boiling water for 2 hours before the same adhesion test as above was carried out. The test piece was rated as follows in terms of the number (X) of coating sections kept unpeeled after the test.

○: X=25 to 21
Δ: X=20 to 6
X: X=5 to 0

(2.6) Overall Evaluation

The test piece was evaluated according to the following criterion by combining all the test items.

○: all items ○ ratings
Δ: no x rating, one or more Δ ratings
x: one or more x ratings The results in Table 2 show that the coating compositions within the scope of the invention (Examples 1 to 3) form coatings which are UV absorptive and transparent to visible light and have improved adhesion, durability, and mar resistance as well as surface hardness and wear resistance.

TABLE 2

| Components, g | | | Example 1 | Comparative Example 1 | Comparative Example 2 | Comparative Example 3 | Example 2 | Example 3 |
|---|---|---|---|---|---|---|---|---|
| Coating composition A | (A) Silicone base | 5103-UVA | 100 | 100 | 100 | 0 | 100 | 100 |
| | | 5103 | 0 | 0 | 0 | 100 | 0 | 0 |
| | (C) UV curing agent | Irgacure 819 | 3 | 0 | 0 | 3 | 3 | 3 |
| | | Darocure 1173 | 0 | 3 | 0 | 0 | 0 | 0 |
| | | Irgacure 369 | 0 | 0 | 3 | 0 | 0 | 0 |
| Coating composition B | (B) Urethane acrylate resin base | PGM-9500 | 100 | 100 | 100 | 100 | 0 | 0 |
| | | PGM-640 | 0 | 0 | 0 | 0 | 100 | 0 |
| | | PGM-340 | 0 | 0 | 0 | 0 | 0 | 100 |
| | (C) UV curing agent | Irgacure 819 | 3 | 0 | 0 | 3 | 3 | 3 |
| | | Darocure 1173 | 0 | 3 | 0 | 0 | 0 | 0 |
| | | Irgacure 369 | 0 | 0 | 3 | 0 | 0 | 0 |
| Property | After 80° C./ 2 min heating | Appearance of coating | Transparent | Transparent | Transparent | Transparent | Transparent | Transparent |
| | After cured by UV of 600 mJ/cm$^2$ | Appearance of coating | Transparent | Transparent | Yellow | Transparent | Transparent | Transparent |
| | | Cured state | Fully cured | Only surface cured | Fully cured | Fully cured | Fully cured | Fully cured |
| | | Cured coating | Good | Wrinkles | Wrinkles in thick section | Good | Good | Good |
| | 375-nm UV absorption | | Absorbing | Absorbing | Absorbing | Non-absorbing | Absorbing | Absorbing |
| | Pencil hardness | | 5H | — | 4H | 5H | 4H | 3H |
| | Initial adhesion | | 25/25 | 0/25 | 25/25 | 25/25 | 25/25 | 25/25 |
| | Adhesion after 100° C./2 hr boiling | | 25/25 | — | 0/25 | 25/25 | 25/25 | 25/25 |
| Evaluation | Processability | UV curability | ○ | X | Δ | ○ | ○ | ○ |
| | Optical properties | Transparency | ○ | ○ | X | ○ | ○ | ○ |
| | | UV screen | ○ | ○ | ○ | X | ○ | ○ |
| | Mar resistance | Hardness | ○ | X | ○ | ○ | ○ | ○ |
| | Adhesion | Initial adhesion | ○ | X | ○ | ○ | ○ | ○ |
| | Durability | Adhesion after boiling | ○ | X | X | ○ | ○ | ○ |
| | Overall evaluation | | ○ | X | X | X | ○ | ○ |

Japanese Patent Application No. 2010-200757 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A coating composition, comprising:
   a first composition comprising (B) a polyfunctional poly(meth)acrylate and (C) a photobleachable photopolymerization initiator for forming a primer layer; and
   a second composition comprising (A) a co-hydrolytic condensate of a UV-absorbing alkoxysilane, a UV-curable alkoxysilane, and a tetraalkoxysilane and (C) a photobleachable photopolymerization initiator for forming a hard coat layer on the primer layer,
   wherein the UV-absorbing alkoxysilane in component (A) is represented by formula (I):

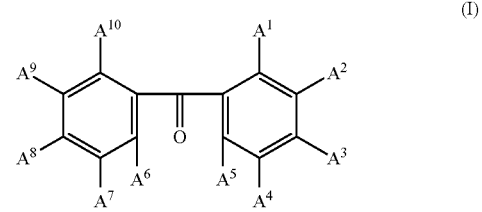

(I)

wherein $A^1$ to $A^{10}$ are each independently hydrogen, hydroxyl, $C_1$-$C_5$ alkyl, or a group represented by formula (i):

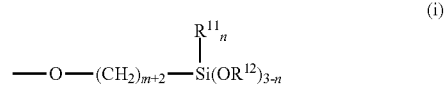

(i)

wherein $R^{11}$ and $R^{12}$ are each independently $C_1$-$C_5$ alkyl, m is an integer of 1 to 5, and n is an integer of 0 to 2, and formula (I) contains at least one hydroxyl group and at least one group represented by formula (i).

2. A coating composition, comprising (A) a co-hydrolytic condensate of a UV-absorbing alkoxysilane, a UV-curable alkoxysilane, and a tetraalkoxysilane, (B) a polyfunctional poly(meth)acrylate, and (C) a photobleachable photopolymerization initiator, wherein the UV-absorbing alkoxysilane in component (A) is represented by formula (I):

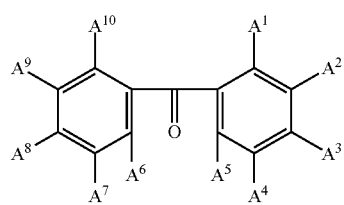

wherein $A^1$ to $A^{10}$ are each independently hydrogen, hydroxyl, $C_1$-$C_5$ alkyl, or a group represented by formula (i):

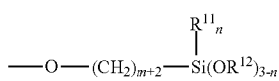

wherein $R^{11}$ and $R^{12}$ are each independently $C_1$-$C_5$ alkyl, m is an integer of 1 to 5, and n is an integer of 0 to 2, and formula (I) contains at least one hydroxyl group and at least one group represented by formula (i).

3. The coating composition of claim 2, wherein the silanes from which the co-hydrolytic condensate (A) is formed include a UV-absorbing alkoxysilane represented by formula (I), a UV-curable alkoxysilane represented by formula (II), and a tetraalkoxysilane represented by formula (III):

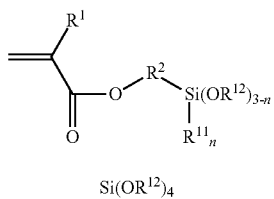

wherein $R^{11}$ and $R^{12}$ are each independently $C_1$-$C_5$ alkyl, n is an integer of 0 to 2, and $R^1$ is hydrogen or methyl, and $R^2$ is a divalent organic group of 1 to 6 carbon atoms.

4. The coating composition of claim 3, wherein the co-hydrolytic condensate (A) is obtained from co-hydrolytic condensation of alkoxysilanes represented by formulae (I) to (III) in the presence of an acidic catalyst.

5. The coating composition of claim 2, wherein the photobleachable photopolymerization initiator (C) is a metallocene, phosphine oxide or polysilane compound.

6. The coating composition of claim 1, wherein the UV-absorbing alkoxysilane in component (A) is represented by formula (I):

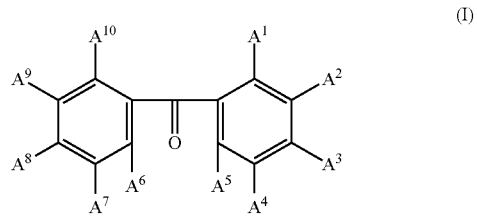

wherein $A^1$ to $A^{10}$ are each independently hydrogen, hydroxyl, $C_1$-$C_5$ alkyl, or a group represented by formula (i):

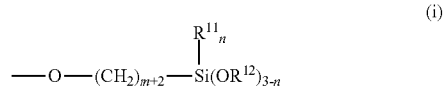

wherein $R^{11}$ and $R^{12}$ are each independently $C_1$-$C_5$ alkyl, m is an integer of 1 to 5, and n is an integer of 0 to 2, and formula (I) contains at least one hydroxyl group and at least one group represented by formula (i).

7. The coating composition of claim 6, wherein the silanes from which the co-hydrolytic condensate (A) is formed include a UV-absorbing alkoxysilane represented by formula (I), a UV-curable alkoxysilane represented by formula (II), and a tetraalkoxysilane represented by formula (III):

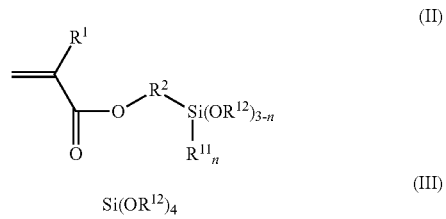

wherein $R^{11}$ and $R^{12}$ are each independently $C_1$-$C_5$ alkyl, n is an integer of 0 to 2, and $R^1$ is hydrogen or methyl, and $R^2$ is a divalent organic group of 1 to 6 carbon atoms.

8. The coating composition of claim 7, wherein the co-hydrolytic condensate (A) is obtained from co-hydrolytic condensation of alkoxysilanes represented by formulae (I) to (III) in the presence of an acidic catalyst.

9. The coating composition of claim 1, wherein the photobleachable photopolymerization initiator (C) is a metallocene, phosphine oxide or polysilane compound.

10. The coating composition of claim 2, wherein the photobleachable photopolymerization initiator (C) is a metallocene, phosphine oxide or polysilane compound.

11. The coating composition of claim 3, wherein the photobleachable photopolymerization initiator (C) is a metallocene, phosphine oxide or polysilane compound.

12. The coating composition of claim 4, wherein the photobleachable photopolymerization initiator (C) is a metallocene, phosphine oxide or polysilane compound.

13. The coating composition of claim 6, wherein the photobleachable photopolymerization initiator (C) is a metallocene, phosphine oxide or polysilane compound.

14. The coating composition of claim 7, wherein the photobleachable photopolymerization initiator (C) is a metallocene, phosphine oxide or polysilane compound.

15. The coating composition of claim 8, wherein the photobleachable photopolymerization initiator (C) is a metallocene, phosphine oxide or polysilane compound.

* * * * *